US010177382B2

(12) United States Patent
Han et al.

(10) Patent No.: US 10,177,382 B2
(45) Date of Patent: Jan. 8, 2019

(54) ADDITIVE FOR POSITIVE ELECTRODE MATERIAL, POSITIVE ELECTRODE MATERIAL AND LITHIUM-ION BATTERY COMPRISING THE SAME, AND METHOD THEREOF

(71) Applicant: BYD COMPANY LIMITED, Shenzhen (CN)

(72) Inventors: Xiaoyan Han, Shenzhen (CN); Shicai Li, Shenzhen (CN); Zhongchun Zhang, Shenzhen (CN)

(73) Assignee: BYD COMPANY LIMITED (CN)

( * ) Notice: Subject to any disclaimer, the term of this patent is extended or adjusted under 35 U.S.C. 154(b) by 275 days.

(21) Appl. No.: 15/129,987

(22) PCT Filed: Apr. 28, 2015

(86) PCT No.: PCT/CN2015/077728
§ 371 (c)(1),
(2) Date: Sep. 28, 2016

(87) PCT Pub. No.: WO2015/165387
PCT Pub. Date: Nov. 5, 2015

(65) Prior Publication Data
US 2017/0133684 A1    May 11, 2017

(30) Foreign Application Priority Data
Apr. 28, 2014    (CN) .......................... 2014 1 0173128

(51) Int. Cl.
H01M 4/62    (2006.01)
H01M 10/0525    (2010.01)
(Continued)

(52) U.S. Cl.
CPC ............... *H01M 4/62* (2013.01); *C01B 25/45* (2013.01); *C01G 53/42* (2013.01); *C01G 53/50* (2013.01);
(Continued)

(58) Field of Classification Search
CPC .... H01M 4/62; H01M 4/1391; H01M 4/1397; H01M 4/505; H01M 4/525;
(Continued)

(56) References Cited

U.S. PATENT DOCUMENTS 9,252,421 B1 * 2/2016 Erickson ............. H01M 4/0404
2002/0172868 A1   11/2002 Manna et al.
(Continued)

FOREIGN PATENT DOCUMENTS

CN    101308925    11/2008
CN    103311552  * 9/2013
(Continued)

OTHER PUBLICATIONS

International Search Report from PCT/CN2015/077728 dated Jul. 22, 2015.

*Primary Examiner* — Ula C Ruddock
*Assistant Examiner* — Matthew W Van Oudenaren
(74) *Attorney, Agent, or Firm* — Calfee, Halter & Griswold LLP

(57) ABSTRACT

An additive for a positive electrode material includes an internal component and an external component. The internal component contains a silane coupling agent modified inorganic lithium salt. The external component is formed on a surface of the internal component and contains a polymer with a low melting point. The internal component and the external component form a core-shell structure together, and the shell has a porosity of 0.01% to 20%. A positive electrode material and a lithium-ion battery including the (Continued)

additive, and method of preparing the lithium-ion battery are also provided.

20 Claims, 2 Drawing Sheets

(51) Int. Cl.
C01B 25/45 (2006.01)
C01G 53/00 (2006.01)
C08K 3/32 (2006.01)
C08K 9/06 (2006.01)
H01M 10/42 (2006.01)
H01M 4/1391 (2010.01)
H01M 4/1397 (2010.01)
H01M 4/505 (2010.01)
H01M 4/525 (2010.01)
H01M 4/58 (2010.01)
H01M 4/131 (2010.01)
H01M 4/136 (2010.01)
H01M 10/052 (2010.01)
H01M 4/36 (2006.01)
H01M 4/485 (2010.01)
H01M 4/02 (2006.01)

(52) U.S. Cl.
CPC .................. *C08K 3/32* (2013.01); *C08K 9/06* (2013.01); *H01M 4/1391* (2013.01); *H01M 4/1397* (2013.01); *H01M 4/505* (2013.01); *H01M 4/525* (2013.01); *H01M 4/5825* (2013.01); *H01M 4/622* (2013.01); *H01M 10/0525* (2013.01); *H01M 10/4235* (2013.01); *C01P 2004/03* (2013.01); *C01P 2006/40* (2013.01); *C08K 2003/328* (2013.01); *C08K 2201/003* (2013.01); *H01M 4/131* (2013.01); *H01M 4/136* (2013.01); *H01M 4/366* (2013.01); *H01M 4/485* (2013.01); *H01M 10/052* (2013.01); *H01M 2004/028* (2013.01)

(58) Field of Classification Search
CPC .... H01M 4/5825; H01M 4/622; H01M 4/131; H01M 4/136; H01M 4/366; H01M 4/485; H01M 10/4235; H01M 10/0525; H01M 10/052; H01M 2004/028; C08K 9/06; C08K 3/32; C01G 53/42; C01G 53/50; C01B 25/45
See application file for complete search history.

(56) References Cited

U.S. PATENT DOCUMENTS

2012/0007028 A1   1/2012  Hwang et al.
2012/0107680 A1*  5/2012  Amiruddin .......... H01M 4/386
                                              429/206

FOREIGN PATENT DOCUMENTS

CN    103682286    3/2014
WO    2011/112042  9/2011

* cited by examiner

ADDITIVE FOR POSITIVE ELECTRODE MATERIAL, POSITIVE ELECTRODE MATERIAL AND LITHIUM-ION BATTERY COMPRISING THE SAME, AND METHOD THEREOF

CROSS-REFERENCE TO RELATED APPLICATION

This application is a national phase of International Application No. PCT/CN2015/077728 filed Apr. 28, 2015, which claims priority to, and benefits of Chinese Patent Application Serial No. 201410173128.8, filed with the State Intellectual Property Office of P. R. C. on Apr. 28, 2014, the entire contents of which are incorporated herein by reference.

FIELD

The present disclosure generally relates to lithium-ion batteries, more particularly relates to an additive for a positive electrode material, a method of preparing an additive for a positive electrode material, a positive electrode material comprising the additive, a lithium-ion battery comprising the additive and a method of preparing the lithium-ion battery.

BACKGROUND

At present, lithium-ion batteries have been widely applied in various kinds of portable devices due to their high output voltage, high energy density and long cycling life. Meanwhile, lithium-ion batteries have been appreciated in many fields such as military affairs, spaceflight, electric vehicle, etc.

At present, a negative electrode in a conventional lithium-ion battery mainly comprises graphite, however, a lithium intercalation potential of a graphite negative electrode is lower than a reduction potential of electrolyte solvents such as PC, EC and DEC, therefore the solvent may be reduced to form a solid electrolyte film (SEI) on the surface of negative electrode. Not only electrons but also lithium ions take parts in the reaction, to form products such as $Li_2CO_3$, LiF and alkyl lithium carbonate. The graphite negative electrode originally has no lithium ions, and lithium source in the negative electrode is from positive electrode material. However, the formation of SEI film may lead to 7%-10% loss of active lithium ions, especially lithium ions in oxides and alloy nanometer materials of the negative electrode material, and more lithium ions may be lost due to a combination of oxide ions and lithium ions, and also due to that a specific surface of the nanometer material is much larger than that of graphite. A loss of lithium may cause lithium ions extractable from the negative electrode to be extracted from the negative electrode completely at a later stage during a subsequent charging-discharging cycle. As the positive electrode still has available lithium insertion vacancies, an electric potential of the positive electrode may keep stable or fall slowly, while an electric potential of the negative electrode may rise quickly because lithium ions thereof has been extracted completely. When the electric potential of the negative electrode is above 1V, a part of the positive electrode SEI film may be damaged. The current collector copper at the negative electrode may be dissolved if the electric potential of the negative electrode rises. The above copper dissolution and damages on SEI film may cause bad influences on the battery performance.

In the related art, in order to prevent damages on the negative SEI film and a dissolution of the copper current collector, the negative electrode must be rich in lithium ions. For example, Chinese patent application publication No. 1290209C discloses a method of lithium supplement. The method comprises: mixing metal lithium, negative electrode material and a non-aqueous liquid to from a slurry, coating the slurry onto a current collector, and then drying, rolling the current collector and injecting an electrolyte. The above method may improve a power density of lithium-ion battery. However, as metal lithium has a high reactivity and tends to react with oxygen and water in the air, the method not only requires a non-aqueous organic solvent that may not react with lithium ions, but also have a restrict requirement on the controlling of water in the preparing process, thereby increasing the process difficulty. The above matters also exist in other patent applications, such as JP1996027910, JP2005038720, CN200610089725 and CN201210351225. In addition, lithium-ion battery has a high requirement on purity of all materials, while the above lithium supplement method may bring side reactions, the impurities of which may have bad influences on the battery performance. A stabilized lithium metal powder (SLMP) produced by American company FMC may be used for lithium supplement, the SLMP may be obtained by modifying a surface of a lithium powder. The SLMP may stay stably in dried air just for several hours, which may limit operation time for the preparation of a battery, including slurry preparation, coating, drying, cutting, rolling and winding. In addition, the SLMP has a strict requirement on environment humidity and oxygen content. If the SLMP is used for lithium supplement, lithium powder may float in the air if a dry process is taken, which may bring a relative higher security risk; and a problem of using non-aqueous organic solvent and controlling of water may exist if a wet process is taken.

SUMMARY

The present disclosure is directed to solve at least one problem existing in the prior art, for example, lithium supplement material may not stay stably for a long time in the air, and impurities may generate in various lithium insertion technologies, both of which may significantly affect the battery performance. Accordingly, an additive for a positive electrode material, a method for preparing the additive, a positive electrode material including the additive, and a lithium-ion battery including the additive are provided, which may not only be used for lithium supplement, but also improve the stability and safety of the lithium-ion battery.

Some embodiments of the present disclosure provide an additive for a positive electrode material, comprising: an internal component comprising a silane coupling agent modified inorganic lithium salt; and an external component formed on a surface of the internal component and comprising a polymer with a low melting point, the internal component and the external component forming a core-shell structure together, and the shell having a porosity of 0.01% to 20%.

Some embodiments of the present disclosure provide a method of preparing an additive for a positive electrode material, including the steps of: providing an internal component comprising a silane coupling agent modified inorganic lithium salt; and mixing the silane coupling agent modified inorganic lithium salt, a polymer with a low melting point and a volatile organic solvent together to form a system, and heating the system until the organic solvent volatilizes completely to form an external component, such that the external component is formed on a surface of the internal component, the internal component and the external component form a core-shell structure together, and the shell has a porosity of 0.01% to 20%.

Some embodiments of the present disclosure provide a positive electrode material for a lithium-ion battery, including: a positive electrode active material; a conductive agent; a binding agent; and the above-identified additive for a positive electrode material according to embodiments of the present disclosure.

Some embodiments of the present disclosure provide a lithium-ion battery, including: a battery shell, a battery core and an electrolyte sealed in the battery shell, the battery core comprising a positive electrode, a negative electrode and a separator disposed therebetween; wherein a positive electrode material of the positive electrode comprises the above-identified additive for a positive electrode material according to embodiments of the present disclosure.

Some embodiments of the present disclosure provide a lithium-ion battery prepared by firstly charging, heating and cooling a primary battery, the primary battery comprising a battery shell, a battery core and an electrolyte sealed in the battery shell, the battery core comprising a positive electrode, a negative electrode and a separator disposed therebetween, wherein a positive electrode material of the positive electrode comprises the above-identified additive for a positive electrode material according to embodiments of the present disclosure.

Some embodiments of the present disclosure provide a method of preparing a lithium-ion battery, including the steps of: preparing a battery core by winding a positive electrode, a negative electrode and a separator disposed therebetween; placing the battery core into a battery shell; injecting an electrolyte into the battery shell; and sealing the battery shell, wherein a positive electrode material of the positive electrode comprises the above-identified additive for a positive electrode material according to embodiments of the present disclosure.

Some embodiments of the present disclosure provide a method of preparing a lithium-ion battery, including the steps of: firstly charging, heating and cooling a primary battery; the primary battery is prepared by the steps of: preparing a battery core by winding a positive electrode, a negative electrode and a separator disposed therebetween, placing the battery core into a battery shell, injecting an electrolyte into the battery shell, and sealing the battery shell; wherein a positive electrode material of the positive electrode comprises the above-identified additive for a positive electrode material according to embodiments of the present disclosure.

With the additive according to some embodiments of the present disclosure, during initially charging the lithium-ion battery, lithium ions be normally extracted from the silane coupling agent modified inorganic lithium salt through the shell, i.e. the polymer with a low melting point. The polymer of the shell is not an ionic conductor, vacancies may be formed in the silane coupling agent modified inorganic lithium salt in a subsequent discharging progress because lithium ions may be extracted from the inorganic lithium salt and these lithium ions cannot be intercalated in the inorganic lithium salt normally, then these lithium ions extracted from the silane coupling agent modified inorganic lithium salt may be kept at the negative electrode, ensuring that the lithium ions are enriched in the negative electrode. In this way, problems in the related art, such as damages on the SEI film at the negative electrode and dissolution of the negative electrode current collector caused by a sharp increase of the negative electrode potential in a later stage of the discharging process due to a loss of lithium ions, may be solved.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
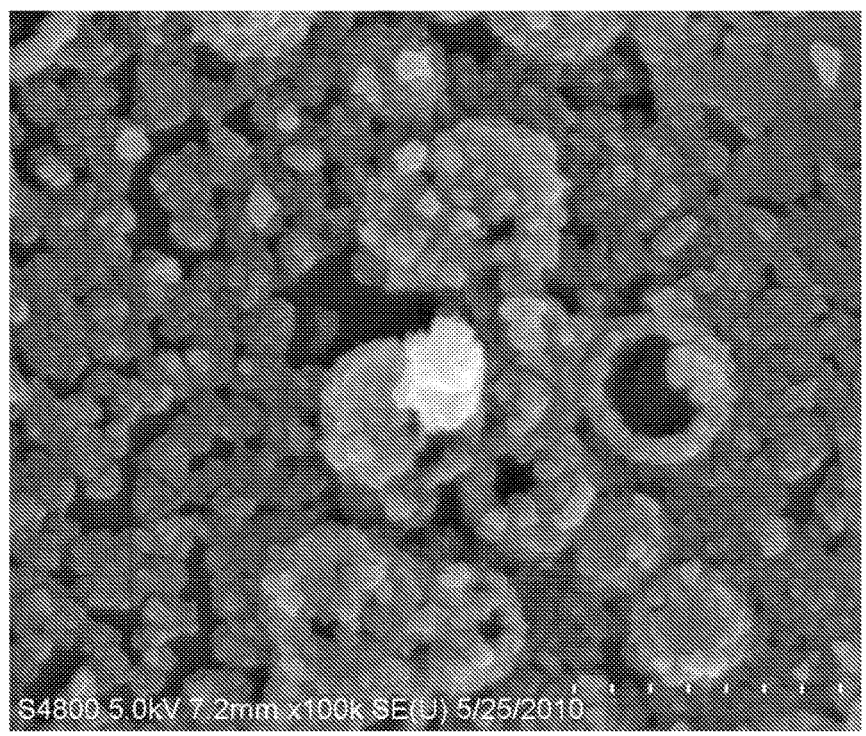
FIG. 1 is a scanning electron microscope (SEM) diagram of an additive for a positive electrode material according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure.

Embodiments of an aspect of the present disclosure provide an additive for a positive electrode material. The additive for a positive electrode material contains an internal component and an external component formed on a surface of the internal component. The internal component contains or consists of a silane coupling agent modified inorganic lithium salt; the external component contains or consists of a polymer with a low melting point; and the internal component and the external component forming a core-shell structure together. The shell has a porosity of 0.01% to 20%.

In some embodiments of the present disclosure, the silane coupling agent modified inorganic lithium salt includes an inorganic lithium salt and a silane coupling agent to modify the inorganic lithium salt. The surface of the inorganic lithium salt is modified by the silane coupling agent, thus enhancing an adhesion between the inorganic lithium salt and the polymer of the shell.

In some embodiments, the silane coupling agent may be any suitable silane coupling agents that are able to enhance a combining ability between the inorganic lithium salt and the low-melting polymer, which may be commercially available, such as KH550 produced by us-liantan.

In some embodiments of the present disclosure, the internal component has an average particle diameter of 30 nm to 25 µm, alternatively 100 nm to 10 µm.

In some embodiments of the present disclosure, the shell has a thickness of 5 nm to 5 µm, alternatively 50 nm to 1 µm.

In some embodiments of the present disclosure, the additive has an average particle diameter of 50 nm to 26 µm.

In some embodiments of the present disclosure, the polymer has a melting point ranging from 60° C. to 140° C., and the polymer has an average molecular weight ranging from 50 to 10000. With the melting point and the average molecular weight, it is more difficult for extracted lithium ions to intercalate into the positive electrode material in a later stage of the charging process, which facilitates the negative electrode to keep lithium ions.

In some embodiments of the present disclosure, the polymer includes a low-density polyethylene. The polymer may be well combined with the silane coupling agent modified inorganic lithium salt and form a porous layer coated on a surface of the silane coupling agent modified inorganic lithium salt easily. With the shell having this polymer, lithium ions may be extracted from the positive electrode normally during initially charging the lithium-ion battery, and these extracted lithium ions may not intercalate into the positive electrode in a subsequent discharging progress, thus ensuring that lithium ions are enriched in the negative electrode. Further, the polymer has a good compatibility with the electrolyte, positive electrode material and negative electrode material of the lithium-ion battery respectively, which may not cause a side reaction to influence the battery performance.

In some embodiments of the present disclosure, the low-density polyethylene has an average molecular weight ranging from 200 to 10000, alternatively 500 to 6000.

In some embodiments of the present disclosure, the silane coupling agent modified inorganic lithium salt is at least one selected from a group consisting of: $LiFe_xMn_yM_zPO_4$, where $0 \leq x \leq 1$, $0 \leq y \leq 1$, $0 \leq z \leq 1$, $x+y+z=1$, and M is at least one selected from the group consisting of Al, Mg, Ga, Ti, Cr, Cu, Zn and Mo; $Li_3V_2(PO_4)_3$; $LiNi_{0.5-x}Mn_{1.5-y}M_{x+y}O_4$, where $-0.1 \leq x \leq 0.5$, $0 \leq y \leq 1.5$, and M is at least one selected from the group consisting of Li, Co, Fe, Al, Mg, Ca, Ti, Mo, Cr, Cu and Zn; $LiVPO_4F$; $Li_{1+x}L_{1-y-z}M_yN_zO_2$, where L, M, N are independently selected from the group consisting of Li, Co, Mn, Ni, Fe, Al, Mg, Ga, Ti, Cr, Cu, Zn, Mo, F, I, S and B, $-0.1 \leq x \leq 0.2$, $0 \leq y \leq 1$, $0 \leq z \leq 1$, $0 \leq y+z \leq 1.0$; $Li_2CuO_2$ and $Li_5FeO_4$. With this silane coupling agent modified inorganic salt, lithium ions in the positive electrode material may be extracted during the initial charge of the lithium-ion battery.

In some embodiments of the present disclosure, the silane coupling agent modified inorganic lithium salt comprises $LiFe_xMn_yM_zPO_4$, where $0 \leq x \leq 1$, $0 \leq y \leq 1$, $0 \leq z \leq 1$, $x+y+z=1$, M is at least one selected from the group consisting of Al, Mg, Ga, Ti, Cr, Cu, Zn, Mo. With this compound, the silane coupling agent modified inorganic lithium salt have a relative lower voltage platform and may be broken more easily during charging and discharging, thus preventing lithium ions from intercalating into the positive electrode and facilitating the negative electrode to keep lithium ions, and thereby lithium ions are enriched in the negative electrode.

In some embodiments of the present disclosure, the silane coupling agent modified inorganic lithium salt comprises $Li_{1+x}L_{1-y-z}M_yN_zO_2$, where L, M, N independently selected from the group consisting of Li, Co, Mn, Ni, Fe, Al, Mg, Ga, Ti, Cr, Cu, Zn, Mo, F, I, S and B, $-0.1 \leq x \leq 0.2$, $0 \leq y \leq 1$, $0 \leq z \leq 1$, $0 \leq y+z \leq 1.0$. With this compound, lithium ions of the positive electrode material may be extracted from the positive electrode more easily, and thereby lithium ions are enriched in the negative electrode.

In some embodiments of the present disclosure, based on the total weight of the additive, the amount of the polymer may be about 0.01 wt % to 40 wt %, and the amount of the silane coupling agent modified inorganic lithium salt modified by silane coupling agent may be about 60 wt % to 99.98 wt %. If the amount of the polymer is too large, a quantity of effective lithium ions available from per unit weight additive may be reduced, meanwhile, the shell layer may be too thick to let extracted lithium ions to move out; if the amount of the polymer is too small, the external component may not cover the internal component completely, and thus lithium ions may intercalate into the positive electrode easily. In both cases, enriching lithium ions in the negative electrode may not be realized.

Embodiments of another aspect of the present disclosure provide a method of preparing an additive for a positive electrode material. The method includes following steps.

In step S1, an internal component containing a silane coupling agent modified inorganic lithium salt is provided.

In some embodiments of the present disclosure, step S1 includes modifying an inorganic lithium salt with a silane coupling agent to obtain the silane coupling agent modified inorganic lithium salt.

In some embodiments of the present disclosure, step S1 includes: adding an inorganic lithium salt into an ethanol solution, heating the solution, then adding a mixture of a silane coupling agent, ethanol and water with stirring until the solvent volatilizes completely.

In some embodiments of the present disclosure, step S1 further comprises washing, filtrating, and drying the product thereof with ethanol solution, thus obtaining the internal component.

In step S2, the silane coupling agent modified inorganic lithium salt, a polymer with a low melting point and a volatile organic solvent are mixed together to form a system, and the system is heated until the organic solvent volatilizes completely to form an external component. The external component is formed on a surface of the internal component, the internal component and the external component form a core-shell structure together, and the shell has a porosity of 0.01% to 20%.

In some embodiments of the present disclosure, step S2 comprises the steps of: dissolving the polymer in a volatile organic solvent; adding the silane coupling agent modified inorganic lithium salt under heating and stirring until the solvent volatilizes completely, such that the polymer is coated on a surface of the silane coupling agent modified inorganic lithium salt; and drying the obtained product.

In some embodiments of the present disclosure, the volatile organic solvent comprises decalin or diphenyl ether. The volatile organic solvent may accelerate a dissolution of the low-density polymer, and may volatilize at a relative lower temperature, such that the polymer may be efficiently coated on the surface of the internal component.

In some embodiments of the present disclosure, the heating is carried out at a temperature of 50-90° C.

In some embodiments of the present disclosure, in step S1, the volume ratio of the silane coupling agent, ethanol and water is 20:72:8.

In some embodiments of the present disclosure, in step S1, the stirring is performed with a stirring speed of 200 to 600 rad/min.

In some embodiments of the present disclosure, in step S1, the drying is carried out at a temperature of 120-160° C.

In some embodiments of the present disclosure, in step S2, a weight ratio of the silane coupling agent modified inorganic lithium salt, the polymer and the volatile organic solvent is 100:(0.01-40):(100-1000).

In some embodiments of the present disclosure, in step S2, the heating is performed at a temperature from 170° C. to 200° C., and the stirring is performed with a stirring speed from 200 to 600 rad/min.

In some embodiments of the present disclosure, the silane coupling agent modified inorganic lithium salt comprises a material that may provide active lithium ions. The inorganic lithium salt may be at least one selected from the group consisting of: LiFe$_x$Mn$_y$M$_z$PO$_4$, where 0≤x≤1, 0≤y≤1, 0≤z≤1, x+y+z=1, and M is at least one selected from the group consisting of Al, Mg, Ga, Ti, Cr, Cu, Zn and Mo; Li$_3$V$_2$(PO$_4$)$_3$; LiNi$_{0.5-x}$Mn$_{1.5-y}$M$_{x+y}$O$_4$, where −0.1≤x≤0.5, 0≤y≤1.5, and M is at least one selected from the group consisting of Li, Co, Fe, Al, Mg, Ca, Ti, Mo, Cr, Cu and Zn; LiVPO$_4$F; Li$_{1+x}$L$_{1-y-z}$M$_y$N$_z$O$_2$, where L, M, N are independently selected from the group consisting of Li, Co, Mn, Ni, Fe, Al, Mg, Ga, Ti, Cr, Cu, Zn, Mo, F, I, S and B, −0.1≤x≤0.2, 0≤y≤1, 0≤z≤1, 0≤y+z≤1.0; Li$_2$CuO$_2$ and Li$_5$FeO$_4$. Before the inorganic lithium salt is coated on the polymer, the surface of the inorganic lithium salt should be modified with a mixture of the silane coupling agent, ethanol and water, thereby enhancing the adhesion between the inorganic lithium salt and the polymer.

With the method of preparing a positive electrode material according to some embodiments of the present disclosure, solvents are evaporated and the external component is coated on the internal component. In addition, on the one hand, the internal component containing inorganic lithium salt (i.e. core) and the external component containing the polymer with a low melting point (i.e. shell) form a core-shell structure, and on the other hand, the shell forms a porous structure, thereby ensuring that lithium ions of the inorganic lithium salt of the core may be extracted during the initial charge of the lithium-ion battery.

Embodiments of the present disclosure further provide a positive electrode material. The positive electrode material contains a positive electrode active material, a conductive agent, a binding agent, and the additive for a positive electrode material described above.

According to some embodiments of the present disclosure, the positive electrode active material may be any conventional positive electrode active material for a lithium-ion battery known to those skilled in the art. For example, the positive electrode active material may be at least one selected from the group consisting of: LiFePO$_4$; LiMn$_2$O$_4$; LiCoO$_2$; Li$_{1+x}$L$_{1-y-z}$M$_y$N$_z$O$_2$, where L, M, N are independently selected from the group consisting of Li, Co, Mn, Ni, Fe, Al, Mg, Ga, Ti, Cr, Cu, Zn, Mo, F, I, S and B, −0.1≤x≤0.2, 0≤y≤1, 0≤z≤1, 0≤y+z≤1.0; LiNi$_{0.5-x}$Mn$_{1.5-y}$M$_{x+y}$O$_4$, where −0.1≤x≤0.5, 0≤y≤1.5, and M is at least one selected from the group consisting of Li, Co, Fe, Al, Mg, Ca, Ti, Mo, Cr, Cu and Zn.

According to some embodiments of the present disclosure, the positive electrode active material comprises a low-voltage material with a charging voltage below 4.4 V.

According to some embodiments of the present disclosure, the internal component of the additive comprises at least one selected from the group consisting of: LiFe$_x$Mn$_y$M$_z$PO$_4$, where 0≤x≤1, 0≤y≤1, 0≤z≤1, x+y+z=1, and M is at least one selected from the group consisting of Al, Mg, Ga, Ti, Cr, Cu, Zn and Mo; Li$_3$V$_2$(PO$_4$)$_3$; LiNi$_{0.5-x}$Mn$_{1.5-y}$M$_{x+y}$O$_4$, where −0.1≤x≤0.5, 0≤y≤1.5, and M is at least one selected from the group consisting of Li, Co, Fe, Al, Mg, Ca, Ti, Mo, Cr, Cu and Zn; LiVPO$_4$F; LiL$_{1-y-z}$M$_y$N$_z$O$_2$, where L, M, N are independently selected from the group consisting of Li, Co, Mn, Ni, Fe, Al, Mg, Ga, Ti, Cr, Cu, Zn, Mo, F, I, S and B, −0.1≤x≤0.2, 0≤y≤1, 0≤z≤1, 0≤y+z≤1.0; Li$_2$CuO$_2$; and Li$_5$FeO$_4$.

According to some embodiments of the present disclosure, the positive electrode active material comprises a high-voltage material with a charging voltage above 4.5 V.

According to some embodiments of the present disclosure, the internal component of the additive comprises at least one selected from the group consisting of: LiNi$_{0.5}$Mn$_{1.5}$M$_1$O$_4$; LiCoPO$_4$; Li$_{1+x}$L$_{1-y-z}$M$_y$N$_z$O$_2$; where L, M, N are independently selected from the group consisting of Li, Co, Mn, Ni, Fe, Al, Mg, Ga, Ti, Cr, Cu, Zn, Mo, F, I, S, B, −0.1≤x≤0.2, 0≤y≤1, 0≤z≤1, 0≤y+z≤1.0.

With the above positive electrode materials according to embodiments of the present disclosure, the positive electrode active material has a charging voltage larger than that of an inorganic lithium salt, therefore, when the lithium-ion battery is subjected to a normal charge-discharge process, the inorganic lithium salt having a relative lower voltage platform may be damaged more easily in the later discharge process. This further prevents lithium ions from intercalating into the positive electrode, and thus lithium ions enriched in the negative electrode may be realized.

According to some embodiments of the present disclosure, based on the total weight of the positive electrode material, the amount of the additive may be about 0.01 wt % to 15 wt %. If the amount of the additive is too small, the effect of lithium ions being enriched in the negative electrode may be not obvious; and if the amount of the additive is too large, the whole performance of the battery may be affected to some extent.

According to some embodiments of the present disclosure, the binding agent may be any conventional binding agent for the positive electrode of a lithium-ion battery known to those skilled in the art. In some embodiments, the binding agent is at least one selected from the group consisting of polyvinylidene fluoride, polytetrafluoroethylene, polyacrylate, polyurethane, epoxy resin, butadiene styrene rubber, poly methyl cellulose, poly methyl cellulose sodium, hydroxypropyl methyl cellulose (HPMC) and polypropylene glycol. Based on 100 weight parts of the positive electrode active material, the amount of the binding agent may be 0.1 to 15 weight parts, alternatively 1 to 7 weight parts.

According to some embodiments of the present disclosure, the conductive agent may be any conventional conductive agent for the positive electrode of a lithium-ion battery known to those skilled in the art. In some embodiments, the conductive agent is at least one selected from the group consisting of graphite, carbon fiber, carbon black, metal powder and fiber. Based on the 100 weight parts of the positive electrode active material, the amount of the conductive agent may be 0.1 to 20 weight parts, alternatively 2 to 10 weight parts.

The method of preparing the positive electrode may be any conventional methods in the art, such as a preparation method comprising the following steps. Firstly, a solvent, the positive electrode active material, the binding agent, the conductive agent and the additive are mixed together to form a slurry. The amount of the solvent may be known to those skilled in the art, which may be properly selected according to the coating viscosity of the slurry and operational requirements. Then the slurry is coated onto the current collector, in which the current collector may be any conventional current collector in the art, such as an aluminum foil. And then the current collector was dried, pressed into sheets, and cut to form positive electrodes for a lithium-ion battery. The drying may be performed at a temperature of 90-150° C. for 10 to 40 min.

The solvent may be any conventional solvent in the art. In some embodiments, the solvent is at least one selected from N-methylpyrrolidone (NMP), N,N-dimethyl formamide (DMF), N,N-diethyl formamide (DEF), dimethyl sulfoxide (DMSO), tetrahydrofuran, water, alcohol and acetone. Based on the 100 weight parts of the positive electrode active material, the amount of the solvent may range from 40 to 90 weight parts, alternatively 50 to 85 weight parts.

Embodiments of the present disclosure further provide a lithium-ion battery. The lithium-ion battery includes a battery shell, a battery core and an electrolyte. The battery core and the electrolyte are sealed in the battery shell. The battery core includes a positive electrode, a negative electrode and a separator disposed between the positive and negative electrodes, and the positive electrode material comprises the additive described above.

Embodiments of the present disclosure further provide a lithium-ion battery. The lithium-ion battery is prepared by the following steps. Firstly a primary battery is formed after injecting electrolyte and sealing the battery shell. Then the primary battery is initially charged, heated, and cooled to obtain the lithium-ion battery.

The primary battery comprises a battery shell, a battery core and an electrolyte, and the battery core and the electrolyte are sealed in the battery shell. The battery core comprises a positive electrode, a negative electrode, and a separator disposed between the positive and negative electrodes. The positive electrode material comprises an additive for a positive electrode material according embodiments of the present disclosure.

In some embodiments of the present disclosure, the primary battery is heated to about 80-110° C., and maintained at about 80-110° C. for about 0.5-10 h.

With the lithium-ion battery according to embodiments of the present disclosure, during the initial charge, lithium ions may be extracted from the additive of the positive electrode material. After the initial charge, the temperature of the battery was increased and maintained. Since the external component of the additive containing the polymer with a low melting point (i.e. shell) is cladded on the internal component (i.e. core) and at least partially has pores, the external component may be melted and attached with the internal component having the silane coupling agent modified inorganic lithium salt. In this way, pores of the shell may be closed, which further prevents lithium ions from intercalating into the positive electrode in the subsequent discharging process and ensures lithium ions are enriched in the negative electrode.

In some embodiments of the present disclosure, the negative electrode may be any conventional negative electrode known in the art. The negative electrode comprises a current collector and a negative electrode material coated on the current collector. The current collector of the present disclosure may be any conventional current collector in the art, such as aluminum foil. There are no limits to the negative electrode material, which may be any conventional ones in the art. For example, the negative electrode material may comprise a negative electrode active material, a binding agent and a conductive agent. The negative electrode active material may be commercial available, such as graphite and/or lithium titanium oxide. The conductive agent may be at least one selected from the group consisting of: natural graphite, artificial graphite, petroleum coke, organic cracking carbon, mesocarbon microbeads, carbon fiber, tin alloy and silicon alloy. The binding agent may be at least one selected from the group consisting of: polyvinylidene fluoride (PVDF), polytetrafluoroethylene (PTFE), carboxymethyl cellulose sodium (CMC) and styrene rubber (SBR). The method of preparing the negative electrode is similar to the method of preparing the positive electrode described above, and thus details thereof are omitted herein.

In some embodiments of the present disclosure, the separator may be any conventional separator for a lithium-ion battery in the art. In one embodiment, the separator may be at least one selected from the group consisting of polyolefin micro-porous membrane, polyethylene felt, fiberglass felt and superfine glass fiber paper.

In some embodiments of the present disclosure, the electrolyte may be any conventional non-aqueous electrolyte in the art. The lithium salt may be at least one selected from the group consisting of $LiPF_6$, $LiClO_4$, $LiBF_4$, $LiAsF_6$, $LiSiF_6$, $LiB(C_6H_5)_4$, $LiCl$, $LiBr$, $LiAlCl_4$, $LiC(SO_2CF_3)_3$, $LiCH_3SO_3$, and $LiN(SO_2CF_3)_2$. The non-aqueous solvent may comprise mixed solution consisted of a chain acid ester and a cyclic acid ester. The chain acid ester may be at least one selected from dimethyl carbonate (DMC), diethyl carbonate (DEC), methyl ethyl carbonate (EMC), methyl propyl carbonate (MPC), dipropyl carbonate (DPC) and other chain organic ester having at least one element consisting of fluorine, sulfur and an unsaturated bond. The cyclic acid ester may be at least one selected from the group consisting of ethylene carbonate (EC), propylene carbonate (PC), vinylene carbonate (VC), γ-butyrolactone (γ-BL), sultone and other chain organic ester having at least one element consisting of fluorine, sulfur and an unsaturated bond. The above non-aqueous solvent may contain an electrolyte slat having a concentration of 0.8-1.2 mol/L.

Embodiments of the present disclosure further provide a method of preparing a lithium-ion battery. The method includes the following steps. Firstly, a positive electrode, a negative electrode, and a separator disposed between the positive electrode and the negative electrode are wound to form a battery core. The battery core is placed into a battery shell, and an electrolyte is injected into the battery shell, and then the battery shell is sealed to form a lithium-ion battery. A positive electrode material of the positive electrode comprises the above-identified additive for a positive electrode material according to the present disclosure. The method of sealing, the amount of the electrolyte and the method of winding of form the battery core may be any well known to those skilled in the art, and thus the description thereof is omitted herein for brevity.

Embodiments of the present disclosure further provide a method of preparing a lithium-ion battery. The method includes the following methods. Firstly, a primary battery is formed after steps of injecting electrolyte and sealing the battery shell, then the primary battery is initially charged, heated and cooled to form the lithium-ion battery. The primary battery is prepared by the steps of: preparing a battery core by winding a positive electrode, a negative electrode, and a separator disposed between the positive electrode and the negative electrode; placing the battery core into a battery shell; injecting an electrolyte into the battery shell; and sealing the battery shell. A positive electrode material of the positive electrode comprises the above-identified additive for a positive electrode material according to the present disclosure. The method of sealing, the amount of the electrolyte and the method of winding of form the battery core may be well known to those skilled in the art, and thus the description thereof is omitted herein for brevity.

In some embodiments of the present disclosure, during heating of the primary battery, the primary battery is heated to a temperature of about 80-110° C., and maintained at about 80-110° C. for about 0.5-10 h.

At the initial charging, lithium ions may be extracted from the additive. After the initial charging, the temperature of the battery was increased and maintained. Since the shell of the additive contains the polymer with a low melting point and has pores partially, the shell may be melted and attached with the silane coupling agent modified inorganic lithium salt in the core. In this way pores of the shell may be closed, which further prevents the lithium from intercalating into the positive electrode in the subsequent discharging process and ensures that lithium ions are enriched in the negative electrode.

According to the method of preparing positive electrode material, after injecting the electrolyte and sealing the battery shell, the primary battery is initially charged, and then heated and cooled. The primary battery is prepared by the steps of: preparing a battery core by winding a positive electrode, a negative electrode, and a separator disposed between the positive and negative electrodes; placing the battery core into a battery shell; injecting an electrolyte into the battery shell; and then sealing the battery shell. A positive electrode material of the positive electrode includes the above-identified additive for a positive electrode material according to embodiments of the present disclosure. After the initial charging, for example, after the battery is charged with 0.05 C until lithium ions in the internal component of the positive electrode material are extracted and a constant voltage is maintained for a certain time period, the temperature of the primary battery was increased to a temperature from 60° C. to 140° C., alternatively 90° C. to 110° C., and maintained at this temperature for about 0.5-10 h, alternatively 1-3 h. With the above temperature and time period, it is ensured that the low-density polyethylene of the shell of the additive is melted to close pores of the shell, and no bad influences are acted on the battery performance.

According to some embodiments of the present disclosure, the additive has a core-shell structure formed by the internal and external components. The internal component (i.e. core) contains a silane coupling agent modified inorganic lithium salt, and the external component (i.e. shell) is coated on a surface of the internal component, contains a polymer with a low melting point, and has a porosity of 0.01% to 20%. During the initial charge of the lithium-ion battery, lithium ions in the silane coupling agent modified inorganic lithium salt may be extracted normally from the internal component through the porous shell of the additive. Since the polymer of the shell is not an ionic conductor, vacancies may be formed in the silane coupling agent modified inorganic lithium salt due to the extraction of lithium ions which fail to intercalate into the positive electrode. In this way, the extracted lithium ions may be kept at the negative electrode, and thus lithium ions are enriched in the negative electrode. The present disclosure has solved at least one problem in the art, such as damages on the negative electrode SEI film and dissolutions of the negative electrode current collector caused by a sharp increase of the negative electrode potential in a later stage of the discharge step due to losses of lithium ions in the charge step.

With the additive and the positive electrode material according to embodiments of the present disclosure, a lithium-ion battery including them may have excellent cycling performances and a high charge-discharge capacity. In addition, a terrible case that zero potential occurred during a storing process of the battery may be avoided, and thus storing performances of the battery may be enhanced.

The present disclosure will be further described in details in conjunction with the detailed examples. And it should be understood that the detailed examples below are only used to explain instead of limiting the present disclosure.

Example 1

Preparation of an Additive for a Positive Electrode Material

A. 20 v % of silane coupling agent KH550, 72 v % of ethanol and 8 v % of water were mixed to form a silane coupling agent solution. 50 g of $LiFePO_4$ was added into ethanol solution and a temperature of the solution was increased to 60° C. 15 ml of the above silane coupling agent solution and the above resulted ethanol solution were mixed and stirred with a stirring speed of 200 rad/min, until the solvent volatilizes completely. The resulted product was dried in a vacuum drying oven at a temperature of 150° C., immersed in ethanol, washed, and centrifugal separated to obtain silane coupling agent modified $LiFePO_4$.

B. To a 500 ml three-necked round-bottomed flask, 100 ml decahydronaphthalene was added and heated to a temperature of 100° C., and stirred with a stirring speed of 200 rad/min. 10 g of low-density polyethylene with a molecular weight of 3000 was added under stirring, and the stirring was continued until the low-density polyethylene was dissolved completely.

C. To the product of step B, 50 g of the above silane coupling agent modified $LiFePO_4$ was added under stirring, and then the system was heated to a temperature of 180° C. The stirring was continued until solvent of the system volatilized completely, and an additive for a positive electrode material A1 was obtained.

Example 2

The method for preparing an additive for a positive electrode material A2 is substantially the same as that in Example 1, except that: $LiNi_{0.8}Co_{0.15}Al_{0.05}O_2$ was used to replace $LiFePO_4$, and an additive for a positive electrode material A2 was obtained.

Example 3

The method for preparing an additive for a positive electrode material A3 is substantially the same as that in Example 1, except that: $Li_{1.2}Ni_{0.2}Mn_{0.6}O_2$ was used to replace $LiFePO_4$, and an additive for a positive electrode material A3 was obtained.

Example 4

The method for preparing an additive for a positive electrode material A4 is substantially the same as that in Example 1, except that: $LiNi_{1/3}Co_{1/3}Mn_{1/3}O_2$ was used to replace $LiFePO_4$, and an additive for a positive electrode material A4 was obtained.

Example 5

The method for preparing an additive for a positive electrode material A5 is substantially the same as that in Example 1, except that: diphenyl ether was used to replace decahydronaphthalene, and an additive for a positive electrode material A5 was obtained.

Example 6

The method for preparing an additive for a lithium battery positive electrode material A6 is substantially the same as that in Example 1, except that: a low-density polyethylene having a molecular weight of 2000 was used to replace the low-density polyethylene having a molecular weight of 3000, and an additive for a positive electrode material A6 was obtained.

Example 7

The method for preparing an additive for a positive electrode material A7 is substantially the same as that in Example 1, except that: the low-density polyethylene having a molecular weight of 4500 was used to replace the low-density polyethylene having a molecular weight of 3000, and an additive for a positive electrode material A7 was obtained.

Example 8

A. Preparation of Positive Electrode 0.041 g of binding agent HSV900 was added into 8.9 g of NMP and dissolved completely, 0.029 g carbon nano tube (CNT) (conductive agent) was added slowly into the above NMP, 5.857 g of $LiCoO_2$ and 0.383 g of the additive A1 were added slowly into the above NMP to form a system, and the system was stirred with a high stirring speed for 2 hours to form a slurry. The slurry was coated uniformly onto both two surfaces of an aluminum foil, forming two layers each having a thickness of 16 μm. Then the aluminum foil was dried at a temperature of 140° C., laminated and cut into positive electrodes each having a size of 454 cm×35 cm×0.0116 cm.

B. Preparation of Negative Electrode 2.75 of graphite, 0.083 g of carbon black (conductive agent) and 0.055 g of PTFE (binding agent) were mixed together in deionized water to form a slurry. The slurry was coated uniformly onto both two surfaces of a copper foil, forming two layers each having a thickness of 8 μm. Then the copper foil was dried at a temperature of 120° C., laminated and cut into negative electrodes each having a size of 454 cm×35 cm×0.0121 cm.

C. Preparation of Separator

Three films PP/PE/PP each having a size of (900±3)mm× 38 mm×0.01 mm were used as the separator.

D. Preparation of Lithium-Ion Battery

The above positive electrode, negative electrode and separator were stacked in a manner that the separator was placed between the positive electrode and the negative electrode, and wound to form a battery core. The battery core was placed in a battery shell, and an electrolyte (lithium salt with a concentration of 1 mol/L) was injected into the shell, and then the battery shell was sealed to form a primary battery having a capacity of 820 mAh. The primary battery was charged to 3.7 V at a rate performance of 0.05 C, the voltage was maintained until current was below 8.2 mA. The primary battery was dried at a temperature of 100° C. for 2 hours, and cooled to room temperature to obtain a lithium-ion battery C1.

Example 9

The method for preparing a lithium-ion battery C2 is substantially the same as that in Example 8, except that: the steps of charging, drying and cooling the primary battery were omitted.

A lithium-ion battery C2 was obtained.

Example 10

The method for preparing a lithium-ion battery C3 is substantially the same as that in Example 8, except that, the following steps were used in the preparation of positive electrode: 0.041 g of HSV900 (binding agent) was added into 8.9 g of NMP and dissolved completely, 0.029 g CNT (conductive agent) was added slowly into the above NMP to disperse uniformly, 5.857 g of $LiCoO_2$ and 0.383 g of the additive A2 were added slowly into the above NMP to form a system, the system was stirred with a high stirring speed for 2 hours to form a slurry. The slurry was coated uniformly onto both two surfaces of an aluminum foil, forming two layers each having a thickness of 16 μm. Then the aluminum foil was dried at a temperature of 140° C., laminated and cut into positive electrodes each having a size of 454 cm×35 cm×0.0116 cm.

A lithium-ion battery C3 was obtained.

Example 11

The method for preparing a lithium-ion battery C4 is substantially the same as that in Example 8, except that, the following steps were used in the preparation of positive electrode: 0.041 g of HSV900 (binding agent) was added into 8.9 g of NMP and dissolved completely, 0.029 g CNT (conductive agent) was added slowly into the above NMP, 6.308 g of $LiNi_{0.5}Mn_{1.5}O_4$ and 0.213 g of the additive A3 were added slowly into the above NMP to form a system, and the system was stirring with a high stirring speed for 2 hours to form a slurry. The slurry was coated uniformly onto both two surfaces of an aluminum foil, forming two layers each having a thickness of 16 μm. Then the aluminum foil was dried at a temperature of 140° C., laminated and cut into positive electrodes each having a size of 454 cm×35 cm×0.0116 cm.

A lithium-ion battery C4 was obtained.

Example 12

The method for preparing a lithium-ion battery C5 is substantially the same as that in Example 8, except that, the following steps were used in the preparation of positive electrode: 0.041 g of HSV900 (binding agent) was added into 8.9 g of NMP and dissolved completely, 0.029 g CNT (conductive agent) was added slowly into the above NMP, 5.857 g of $LiCoO_2$ and 0.213 g of the additive A4 were added slowly into the above NMP to form a system, and the system was stirred with a high stirring speed for 2 hours to form a slurry. The slurry was coated uniformly on both two surfaces of an aluminum foil, forming two layers each having a thickness of 16 μm. Then the aluminum foil was dried at a temperature of 140° C., laminated and cut into positive electrodes each having a size of 454 cm×35 cm×0.0116 cm.

A lithium-ion battery C5 was obtained.

Example 13

The method for preparing a lithium-ion battery C6 is substantially the same as that in Example 8, except that, the following steps are used in the preparation of positive electrode: 0.041 g of HSV900 (binding agent) was added into 8.9 g of NMP and dissolved completely, 0.029 g CNT (conductive agent) was added slowly into the above NMP, 5.857 g of $LiCoO_2$ and 0.213 g of the additive A5 were added slowly into the above NMP to form a system, and the system was stirred with a high stirring speed for 2 hours to form a slurry. The slurry was coated uniformly on both two surfaces of an aluminum foil, forming two layers each having a thickness of 16 μm. Then the aluminum foil was dried at a temperature of 140° C., laminated and cut into positive electrodes each having a size of 454 cm×35 cm×0.0116 cm.

A lithium-ion battery C6 was obtained.

Example 14

The method for preparing a lithium-ion battery C7 is substantially the same as that in Example 8, except that, the following steps were used in the preparation of positive electrode: 0.041 g of HSV900 (binding agent) was added into 8.9 g of NMP and dissolved completely, 0.029 g CNT (conductive agent) was added slowly into the above NMP, 5.857 g of $LiCoO_2$ and 0.213 g of the additive A6 were added slowly into the above NMP to form a system, the system was stirred with a high stirring speed for 2 hours to form a slurry. The slurry was coated uniformly on both two surfaces of an aluminum foil, forming two layers each having a thickness of 16 μm. Then the aluminum foil was dried at a temperature of 140° C., laminated and cut into positive electrodes each having a size of 454 cm×35 cm×0.0116 cm.

A lithium-ion battery C7 was obtained.

Example 15

The method for preparing a lithium-ion battery C8 is substantially the same as that in Example 8, except that, the following steps were used in the preparation of positive electrode: 0.041 g of HSV900 (binding agent) was added into 8.9 g of NMP and dissolved completely, 0.029 g CNT (conductive agent) was added slowly into the above NMP, 5.857 g of $LiCoO_2$ and 0.213 g of the additive A7 were added slowly into the above NMP to form a system, the system was stirred 2 hours to form a slurry. The slurry was coated uniformly on both two surfaces of an aluminum foil, forming two layers each having a thickness of 16 μm. Then the aluminum foil was dried at a temperature of 140° C., laminated and cut into positive electrodes each having a size of 454 cm×35 cm×0.0116 cm.

A lithium-ion battery C8 was obtained.

Example 16

The method for preparing a lithium-ion battery C9 is substantially the same as that in Example 8, except that, the following steps were used in the preparation of positive electrode: 0.041 g of HSV900 (binding agent) was added into 8.9 g of NMP and dissolved completely, 0.029 g CNT (conductive agent) was added slowly into the above NMP, 6.308 g of $LiNi_{0.5}Mn_{1.5}O_4$ and 0.315 g of the additive A3 were added slowly into the above NMP to form a system, and the system was stirred with a high stirring speed for 2 hours to form a slurry. The slurry was coated uniformly on both two surfaces of an aluminum foil, forming two layers each having a thickness of 16 μm. Then the aluminum foil was dried at a temperature of 140° C., laminated and cut into positive electrodes each having a size of 454 cm×35 cm×0.0116 cm.

A lithium-ion battery C9 was obtained.

Comparative Example 1

The present comparative example provides a lithium-ion battery D1 in the related art.

The method for preparing the lithium-ion battery was substantially the same as that in Example 9, except that, the following steps were used in the preparation of positive electrode: 0.041 g of HSV900 (binding agent) produced by BASF was added into 8.9 g of NMP and dissolved completely, 0.029 g CNT (conductive agent) was added slowly into the above NMP, 5.857 g of $LiCoO_2$ was added slowly into the above NMP to form a system, and the system was stirred with a high stirring speed for 2 hours to form a slurry. The slurry was coated uniformly on both two surfaces of an aluminum foil, forming two layers each having a thickness of 16 μm. Then the aluminum foil was dried at a temperature of 140° C., laminated and cut into positive electrodes each having a size of 454 cm×35 cm×0.0116 cm.

A lithium-ion battery D1 was obtained.

Comparative Example 2

The present comparative example provides a lithium-ion battery D2 in the related art.

The method for preparing the lithium-ion battery was substantially the same as that in Example 9, except that, the following steps were used in the preparation of positive electrode: 0.041 g of HSV900 (binding agent) produced by BASF was added into 8.9 g of NMP and dissolved completely, 0.029 g CNT (conductive agent) was added slowly into the above NMP, 6.308 g of $LiNi_{0.5}Mn_{1.5}O_4$ was added slowly into the above NMP to form a system, and the system was stirred with a high stirring speed for 2 hours to form a slurry. The slurry was coated uniformly on both two surfaces of an aluminum foil, forming two layers each having a thickness of 16 μm. Then the aluminum foil was dried at a temperature of 140° C., laminated and cut into positive electrodes each having a size of 454 cm×35 cm×0.0116 cm.

A lithium-ion battery D2 was obtained.

Comparative Example 3

The present comparative example provides a lithium-ion battery D3 in the related art.

The method for preparing the lithium-ion battery was substantially the same as that in Comparative Example 1, with the following exceptions. After slurry coating and drying of the negative electrode, 0.015 g lithium powders SLMP dispersed in an inert organic solvent were sprayed onto a surface of the negative electrode, dried under vacuum, and pressed into negative electrode sheets, while the volatized solvents were recovered. The negative electrode, the positive electrode and the separator were wound to form a battery core, and then a lithium-ion battery D3 was formed. The steps of winding and injecting electrolyte should be finished within 8 hours after the negative electrode was coated with lithium powders.

Performance Test

1. Scanning Electron Microscope (SEM)

The additive A1 was tested with a SEM, and the results were shown in FIG. 1.

Figure 2:
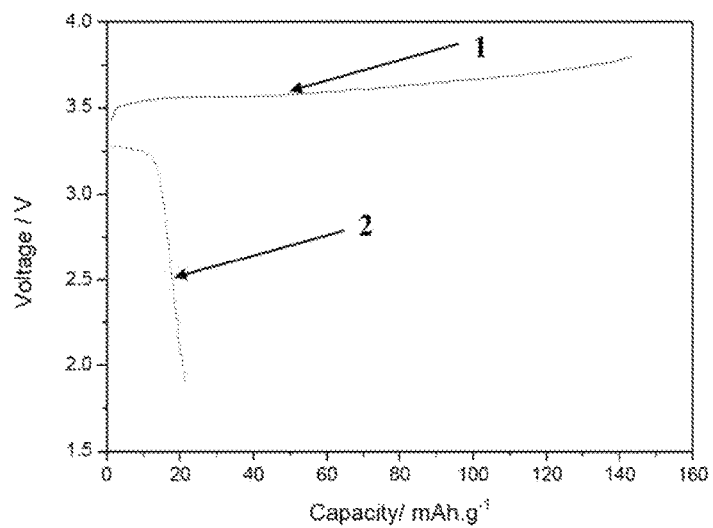
FIG. 2 shows a curve of weight specific capacities of extractable lithium and intercalatable lithium after a heat treatment of an additive according to an embodiment of the present disclosure.

2. Charging-Discharging Test (1) A mixture of the additive A1, acetylene black and PVDF with a weight ratio of 85:10:5 was coated on an aluminum foil to form a positive electrode of battery, and a button battery was prepared by using this positive electrode, graphite as a negative electrode, and a mixing solution of solution (EC:DEC:DMC=1:1:1) and $LiPF_6$ (1 mol/L) as electrolyte. The button battery B1 was charged with a constant current of 0.1 mA until the voltage was 3.7 V, and maintained at a temperature of 100° C. for 2 hours, then cooled to room temperature. Then, the battery was discharged with a constant current of 0.1 mA until the voltage was 1.9 V. A charge-discharge diagram of the battery was shown in FIG. 2, in which the curve 1 in FIG. 2 shows the specific capacity of firstly extracted lithium, and the curve 2 in FIG. 2 shows the specific capacity of intercalated lithium after a heat treatment of the positive electrode.

Figure 3:
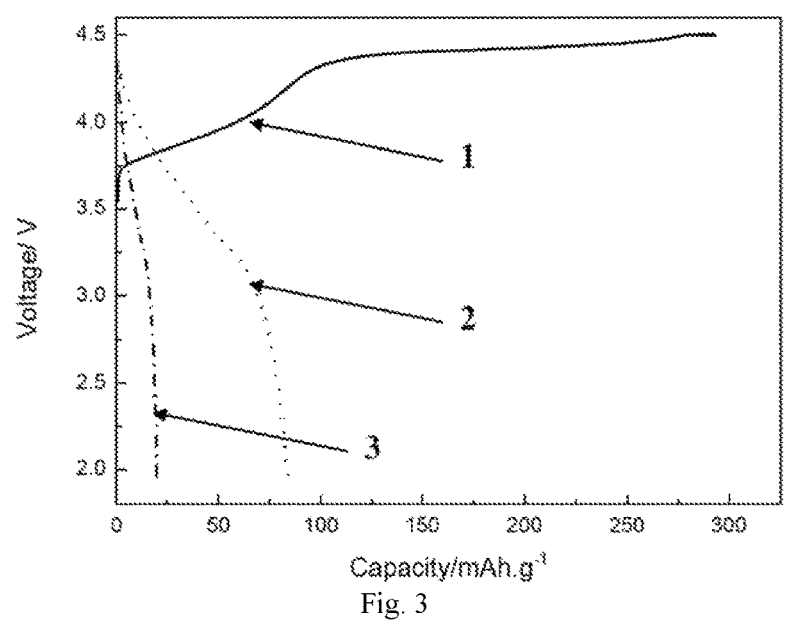
FIG. 3 shows a curve of weight specific capacities of extractable lithium, intercalatable lithium without heat treatment, and intercalatable lithium after a heat treatment of an additive according to an embodiment of the present disclosure.

(2) A mixture of the additive A3, acetylene black and PVDF with a weight ratio of 85:10:5 was coated on an aluminum foil to form a positive electrode of a battery. A plurality of button batteries B2 were formed, each formed by using this positive electrode, graphite as a negative electrode, and a mixing solution of solution (FEC:EMC=3:7) and $LiPF_6$ (1 mol/L) as electrolyte. These button batteries B2 were charged with a constant current of 0.05 C until the voltage was 4.6 V, and a part of these button batteries were maintained at a temperature of 100° C. for 2 hours, then cooled to room temperature. Then, these batteries were discharged with a constant current of 0.05 C until the voltage was 1.9 V. The charge-discharge curve of these batteries was shown in FIG. 3. The remaining batteries were not subjected to the heating, temperature maintaining and cooling process, and subjected to the 0.05 C discharging step directly. The discharge curve was shown in curve 2 of FIG. 3, and the charge-discharge curve was shown in curve 3 of FIG. 3. As described, the curve 1 of FIG. 3 shows the specific capacity of firstly extracted lithium, the curve 2 of FIG. 3 shows the specific capacity of intercalated lithium without heat treatment, and the curve 3 of FIG. 3 shows the specific capacity of intercalated lithium after a heat treatment of the positive electrode.

3. Cycling Test

The cycling ability of the lithium-ion batteries was tested at a temperature of 25° C., under following charging-discharging conditions.

Lithium-ion batteries C1 and C6-C8 were tested in following conditions. The lithium-ion battery was initially charged at a rate performance of 0.05 C until the voltage was 3.7 V, the voltage was maintained until the current was smaller than 8.2 mA. The lithium ion battery was dried at a temperature of 100° C. for 2 hours, and cooled to room temperature, then subjected to a charge-discharge process between 3.0 V and 4.2 V at a rate performance of 1 C/1 C for 500 times. The results were recorded in Table 1.

Lithium-ion battery C2 was tested in following conditions. The battery was initially charged at a rate performance of 0.05 C until the voltage was 3.7 V, and the voltage was maintained until the current was smaller than 8.2 mA. The lithium ion battery was settled for 1 hour and subjected to a charge-discharge process between 3.0 V and 4.2 V at a rate performance of 1 C/1 C for 500 times. The results were recorded in Table 1.

Lithium-ion batteries C3 and C5 were tested in following conditions. The battery was initially charged at a rate performance of 0.05 C until the voltage was 4.2 V, and the voltage was maintained until the current was smaller than 8.2 mA. The lithium ion battery was dried at 100° C. for 2 hours, cooled to room temperature, and subjected to a charge-discharge process between 3.0 V and 4.2 V at a rate performance of 1 C/1 C for 500 times. The results were recorded in Table 1.

Lithium-ion batteries C4 and C9 were tested in following conditions. The battery was initially charged at a rate performance of 0.05 C until the voltage was 4.6 V, and the voltage was maintained until the current was smaller than 8.2 mA. The lithium ion battery was dried at 100° C. for 2 hours, cooled to room temperature, and subjected to a charge-discharge process between 3.0 V and 4.85 V at a rate performance of 1 C/1 C for 200 times. The results were recorded in Table 2.

Lithium-ion batteries D1 and D3 were tested in following conditions. The lithium-ion battery was subjected to a charge-discharge process between 3.0 V and 4.2 V at a rate performance of 1 C/1 C for 500 times. The results were recorded in Table 1.

Lithium-ion battery D2 was tested in following conditions. The lithium ion battery was subjected to a charge-discharge process between 3.0 V and 4.85 V at a rate performance of 1 C/1 C for 200 times. The results were recorded in Table 2.

Then, the lithium supplement capacity was calculated according to the following equation: lithium supplement capacity=effective specific capacity of extracted lithium of additive*weight of additive, and the results were recorded in Table 1 and Table 2.

The cycling capacity retention rate was calculated according to the following equation: cycling capacity retention rate=capacity of extracted lithium after 500 (or 200) times of cycling/capacity of firstly extracted lithium*100%, the results were recorded in Table 1 and Table 2.

Discharging capacity at the $10^{th}$ cycling: the lithium ion battery was subjected to a charging-discharging process at a rate performance of 1 C/1 C for 1 hour for ten times, the charge-discharge voltage of each battery was the same as that described above, the results were recorded in Table 1 and Table 2.

TABLE 1

| | Lithium supplement capacity (mAh) | Discharging capacity at $10^{th}$ cycling (mAh) | Capacity retention rate after cycling for 500 times (%) |
|---|---|---|---|
| C1 | 53.57 | 826 | 91.3 |
| C2 | 34.44 | 823 | 88.7 |
| C3 | 55.81 | 822 | 92.0 |
| C5 | 53.57 | 823 | 91.6 |
| C6 | 53.57 | 825 | 91.4 |
| C7 | 53.57 | 826 | 92.1 |
| C8 | 53.57 | 823 | 90.8 |
| D1 | 0 | 825 | 82.1 |
| D3 | 53.24 | 824 | 90.2 |

TABLE 2

| | Lithium supplement capacity (mAh) | Discharging capacity at $10^{th}$ cycling (mAh) | Capacity retention rate after cycling for 200 times (%) |
|---|---|---|---|
| C4 | 54.67 | 821 | 90.1 |
| C9 | 53.57 | 829 | 94.0 |
| D2 | 0 | 820 | 75.9 |

It can be seen from FIG. 1 that, the low-density polyethylene is cladded on the surface of $LiFePO_4$, and the low-density polyethylene layer had a pore structure, i.e. being porous.

It can be seen from FIG. 2 that, for the button battery using the additive A1 in the positive electrode, 140 mAh/g of lithium may be extracted from the positive electrode during the first charging. After the first charging, the battery is kept at a constant temperature of 100° C. for 2 hours, cooled, and then subjected to a discharging process. In the subsequent discharging progress, only 20 mAh/g of lithium may be intercalated into the positive electrode, i.e., 85.7% lithium ions may be kept at the negative electrode, thereby realizing an effect that the lithium is enriched in the negative electrode.

It can be seen from FIG. 3 that, for the button battery comprising the additive A3 in the positive electrode, 290 mAh/g of lithium may be extracted from the positive electrode during the first charging. If discharged at a rate performance of 0.5 C, only 82 mAh/g lithium ions may be intercalated into the positive electrode, i.e., only 71.7% of lithium may be kept at the negative electrode. If the battery was kept at a constant temperature of 100° C. for 2 hours after the first charging, and then cooled, and discharged at a rate performance of 0.5 C, only 19 mAh/g of lithium may be intercalated into the positive electrode, i.e., 93% lithium ions may be kept at the negative electrode.

It can be seen that, by using the additive according to embodiments of the present disclosure, lithium ions may be extracted from the positive electrode during the first charging, and the intercalation of at least a part of the extracted lithium ions may be prevented in the subsequent discharging progress, thus ensuring that lithium ions are enriched in the negative electrode. In addition, if the additive is heated after the first charging, the effect of preventing lithium ions from intercalating into the positive electrode may better, which further ensures lithium ions are enriched in the negative electrode.

As can be seen from the results in Table 1, low-voltage batteries C1-C3 and C5-C8 contain the additives according to embodiments of the present disclosure respectively, and have relative higher lithium supplement capacities. Further, capacity retention rates after cycling for 500 times of batteries C1-C3 and C5-C8 are much larger than that of D1. With a negative electrode coated with lithium powders directly, D3 had a good lithium insertion effect. However, the difficulty and cost for the whole process are both increased, because lithium has a very active chemical character which renders the process a high risk and a strict environmental control requirement. Worse still, as the lithium powers may not distributed uniformly on the surface of the positive electrode, lithium dendrites tend to be formed, which not only influences the lithium supplement effect, but also damages the security performance of the battery.

As can be seen from the results in Table 2, high-voltage batteries C4 and C9 contain the additives according to embodiments of the present disclosure respectively, and have relative higher lithium supplement capacities, and have capacity retention rates after cycling for 200 times much larger than that of D2.

As can be seen from the results in Table 1 (for example, data related to C1, C3, C5 to C8, and C2), by heating, keeping at a constant temperature and cooling the battery, the effect that lithium ions are enriched in the negative electrode may be better achieved. By heating the battery after first charging, the shell containing the polymer with a low melting point and coated on the surface of the core (i.e. the internal component containing the silane coupling agent modified inorganic lithium salt) may be melted and attached with the core, and thus that pores of the shell may be closed, which prevents lithium ions from intercalating into the positive electrode in the subsequent discharging process. In this way, it is further ensured that lithium ions are enriched in the negative electrode.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:

1. An additive for a positive electrode material, comprising:
   an internal component comprising a silane coupling agent modified inorganic lithium salt;
   an external component formed on a surface of the internal component and comprising a polymer, the internal component and the external component forming a core-shell structure together, and the shell having a porosity of 0.01% to 20%.

2. The additive according to claim 1, wherein the silane coupling agent modified inorganic lithium salt comprises an inorganic lithium salt and a silane coupling agent to modify the inorganic lithium salt.

3. The additive according to claim 1, wherein the internal component has an average particle diameter of 30 nm to 25 µm.

4. The additive according to claim 1, wherein the shell has a thickness of 5 nm to 5 µm.

5. The additive according to claim 1, wherein the additive has an average particle diameter of 50 nm to 26 µm.

6. The additive according to claim 1, wherein the polymer has a melting point of 60° C. to 140° C.

7. The additive according to claim 1, wherein the polymer has an average molecular weight of 50 to 10000.

8. The additive according to claim 1, wherein the polymer comprises low-density polyethylene.

9. The additive according to claim 8, wherein the low-density polyethylene has an average molecular weight of 200 to 10000.

10. The additive according to claim 9, wherein the low-density polyethylene has an average molecular weight of 500 to 6000.

11. The additive according to claim 2, wherein the silane coupling agent modified inorganic lithium salt is at least one selected from the group consisting of:
   $LiFe_xMn_yM_zPO_4$, where $0 \leq x \leq 1$, $0 \leq y \leq 1$, $0 \leq z \leq 1$, $x+y+z=1$, and M is at least one selected from the group consisting of Al, Mg, Ga, Ti, Cr, Cu, Zn and Mo;
   $Li_3V_2(PO_4)_3$;
   $LiNi_{0.5-x}Mn_{1.5-y}M_{x+y}O_4$, where $-0.1 \leq x \leq 0.5$, $0 \leq y \leq 1.5$, and M is at least one selected from the group consisting of Li, Co, Fe, Al, Mg, Ca, Ti, Mo, Cr, Cu and Zn;
   $LiVPO_4F$;
   $Li_{1+x}L_{1-y-z}M_yN_zO_2$, where L, M, N are independently selected from the group consisting of Li, Co, Mn, Ni, Fe, Al, Mg, Ga, Ti, Cr, Cu, Zn, Mo, F, I, S and B, $-0.1 \leq x \leq 0.2$, $0 \leq y \leq 1$, $0 \leq z \leq 1$, $0 \leq y+z \leq 1.0$;
   $Li_2CuO_2$; and
   $Li_5FeO_4$.

12. The additive according to claim 1, wherein based on the total weight of the additive, the amount of the polymer is 0.01 wt % to 40 wt %, and the amount of the silane coupling agent modified inorganic lithium salt is 60 wt % to 99.98 wt %.

13. A method of preparing an additive for a positive electrode material, comprising the steps of:
   providing an internal component comprising a silane coupling agent modified inorganic lithium salt; and
   mixing the silane coupling agent modified inorganic lithium salt, a polymer and a volatile organic solvent together to form a system, and heating the system until the organic solvent volatilizes completely to form an external component, such that the external component is formed on a surface of the internal component, the internal component and the external component form a core-shell structure together, and the shell has a porosity of 0.01% to 20%.

14. The method according to claim 13, wherein the step of providing an internal component comprises modifying an inorganic lithium salt with a silane coupling agent to obtain the silane coupling agent modified inorganic lithium salt.

15. The method according to claim 13, further comprising drying the core-shell structure.

16. The method according to claim 14, wherein in the step of providing an internal component, the ratio between the inorganic lithium salt and the silane coupling agent is 100:0.01 to 100:15.

17. The method according to claim 13, wherein in the step of mixing, a weight ratio of the silane coupling agent modified inorganic lithium salt to the polymer to the volatile organic solvent is 100:0.01:100 to 100:40:1000.

18. The method according to claim 13, wherein the volatile organic solvent comprises decalin or diphenyl ether.

19. A positive electrode material for a lithium-ion battery, comprising:
   a positive electrode active material;
   a conductive agent;
   a binding agent; and
   an additive according to claim 1.

20. The positive electrode material according to claim 19, wherein the positive electrode active material comprises a low-voltage material with a charging voltage below 4.4 V.

* * * * *